(12) United States Patent  
Ljolje et al.

(10) Patent No.: US 9,305,546 B2  
(45) Date of Patent: *Apr. 5, 2016

(54) SYSTEM AND METHOD FOR HANDLING MISSING SPEECH DATA

(71) Applicant: AT&T Intellectual Property I, L.P., Atlanta, GA (US)

(72) Inventors: Andrej Ljolje, Morris Plains, NJ (US); Alistair D. Conkie, Morristown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,745

(22) Filed: Jun. 9, 2014

(65) Prior Publication Data

US 2014/0288937 A1    Sep. 25, 2014

Related U.S. Application Data

(63) Continuation of application No. 12/275,920, filed on Nov. 21, 2008, now Pat. No. 8,751,229.

(51) Int. Cl.  
*G10L 15/00* (2013.01)  
*G10L 15/18* (2013.01)  
*G06F 17/27* (2006.01)  
*G10L 15/20* (2006.01)

(52) U.S. Cl.  
CPC ............ *G10L 15/1815* (2013.01); *G06F 17/27* (2013.01); *G10L 15/20* (2013.01)

(58) Field of Classification Search  
CPC .......... G10L 15/00; G10L 15/01; G10L 15/04; G10L 15/05; G10L 15/065; G10L 15/183; G10L 15/187; G10L 15/19; G10L 15/20; G10L 2015/00; G10L 2015/228  
USPC .......... 704/257, 220, 231, 251, 236, 254, 255  
See application file for complete search history.

(56) References Cited

U.S. PATENT DOCUMENTS

| | | |
|---|---|---|
| 6,993,483 B1 | 1/2006 | Milner |
| 2002/0046021 A1 | 4/2002 | Cox et al. |
| 2004/0186717 A1 | 9/2004 | Savic et al. |
| 2008/0243277 A1 | 10/2008 | Kadel |

*Primary Examiner* — Qi Han  
(74) *Attorney, Agent, or Firm* — Guntin & Gust, PLC; Ed Guntin

(57) ABSTRACT

Disclosed herein are systems, computer-implemented methods, and tangible computer-readable media for handling missing speech data. The computer-implemented method includes receiving speech with a missing segment, generating a plurality of hypotheses for the missing segment, identifying a best hypothesis for the missing segment, and recognizing the received speech by inserting the identified best hypothesis for the missing segment. In another method embodiment, the final step is replaced with synthesizing the received speech by inserting the identified best hypothesis for the missing segment. In one aspect, the method further includes identifying a duration for the missing segment and generating the plurality of hypotheses of the identified duration for the missing segment. The step of identifying the best hypothesis for the missing segment can be based on speech context, a pronouncing lexicon, and/or a language model. Each hypothesis can have an identical acoustic score.

20 Claims, 3 Drawing Sheets

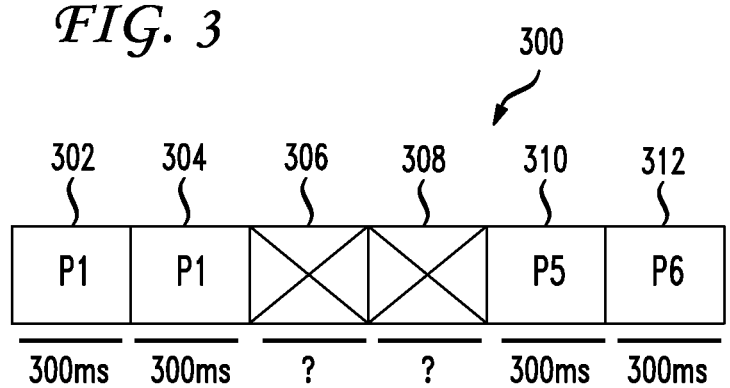
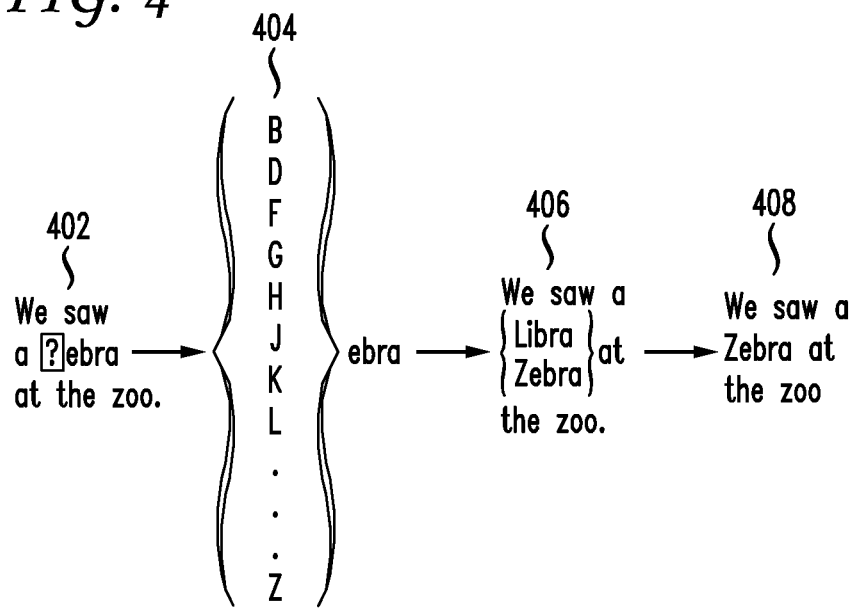

SYSTEM AND METHOD FOR HANDLING MISSING SPEECH DATA

PRIORITY INFORMATION

The present application is a continuation of U.S. patent application Ser. No. 12/275,920, filed Nov. 21, 2008, the content of which is incorporated herein by reference in its entirety.

BACKGROUND OF THE INVENTION

1. Field of the Invention

The present invention relates to speech recognition and more specifically to performing speech recognition when portions of speech are missing.

2. Introduction

Speech recognition systems must operate with user input from more and more locations, such as cellular phones and Voice over IP (VoIP) phones. Communication networks for such systems are typically packet-switched, meaning that occasionally packets representing portions of speech go missing. These short, missing segments of speech hinder the accuracy of speech recognition engines because they assume all the speech is present. One method currently known in the art to handle missing portions of speech is to invent, generate, or extrapolate data based on the non-missing, adjacent segments of speech. This approach is flawed because a speech recognition engine can misrecognize certain words if the wrong speech segment is missing or if multiple speech segments in close proximity are missing. For example, a traditional speech recognition engine can determine the missing segment in "unnecess?ry". The same speech recognition engine can encounter difficulty when determining the missing segments in "inter?ontine?tal". A speech recognition engine may recognize "inter?ontine?tal" as "enter on tin metal" or "enter on tin dental". Another method currently known in the art is to ignore missing portions of speech as if they never existed. This approach is flawed because missing syllables and phonemes can lead to worse recognition results. In both approaches, the original problem of missing speech segments is compounded by the user confusion in future utterances based on the initial poor recognition results. Accordingly, what is needed in the art is an improved way to recognize and/or synthesize speech with missing segments.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for handling missing speech data. The computer-implemented method includes receiving speech with a missing segment, generating a plurality of hypotheses for the missing segment, identifying a best hypothesis for the missing segment, and recognizing the received speech by inserting the identified best hypothesis for the missing segment. In another method embodiment, the final step is replaced with synthesizing the received speech by inserting the identified best hypothesis for the missing segment. In one aspect, the method further includes identifying a duration for the missing segment and generating the plurality of hypotheses of the identified duration for the missing segment. The step of identifying the best hypothesis for the missing segment can be based on speech context, a pronouncing lexicon, and/or a language model. Each hypothesis can have an identical acoustic score.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 3 illustrates received speech with a missing segment;
FIG. 4 illustrates an example of identifying a best hypothesis for a missing segment.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
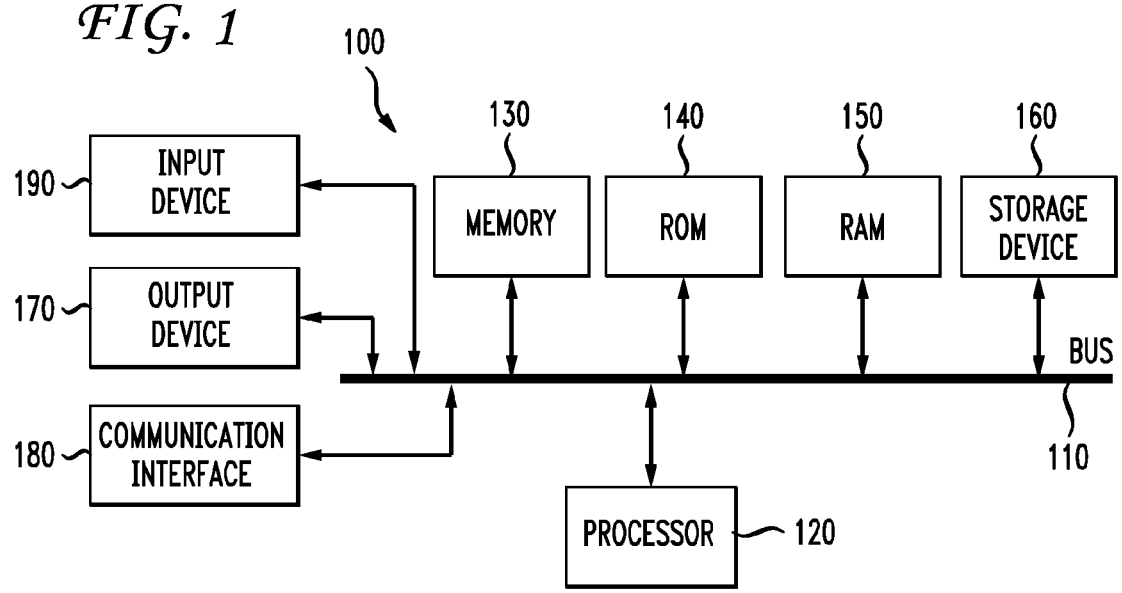
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
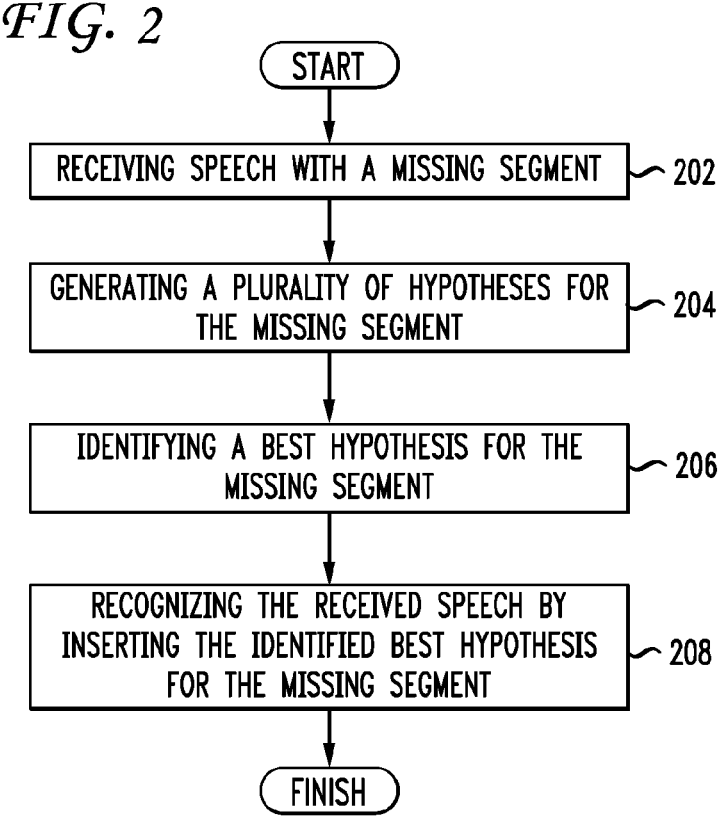
FIG. 2 illustrates an example method embodiment.

Having disclosed some fundamental system elements, the disclosure turns to the exemplary method embodiment as shown in FIG. 2. For clarity, the method is discussed in terms of a system configured to perform the method of handling missing speech data for speech recognition and/or speech synthesis. Instead of using actual scores from the acoustic model used in recognition on data "invented" for use instead of the missing speech, the method exploits the fact that missing packets are detectable, declares the missing speech segment as such, and instead of using real scores on "invented" data, the method uses the same "invented" score on all parts of the model, thus declaring all competing hypotheses identical acoustically. The decision then depends on factors such as the true speech context, the pronouncing lexicon and the language model.

The system receives speech with a missing segment (202). One way that missing segments can occur is when the speech is transmitted over a packet-switched network such as VoIP over the Internet or a telephone call over a modern telephone network that uses virtual circuit switching, a packet-switched emulation of the older circuit-switched telephone networks. Such networks can drop information packets which represent speech segments. For example, a packet switched network splits a user utterance into multiple packets and transmits each through a network individually. Each packet can travel through a different network path and packets can arrive at the destination at different times, in a different order, and some packets are lost. The destination side reassembles the packets. One common problem in VoIP is dropping the first part of speech while the packets find reliable packet-switched connections. Circuit switched networks establish a fixed circuit between two parties to transmit speech, and can consequently provide only a limited number of connections at any given time. While circuit switched networks do not typically drop packets, they are susceptible to interference and missing segments.

For example, some equipment transmits all zeros or some other constant number when information is missing. The system can detect patterns in the speech data such as all zeros. This is often the case when an algorithm, commonly known as a Voice Activity Detector (VAD), in the edge device, such as a cell phone, determines that no speech is present. The edge device minimizes the bit rate by sending an indication that no speech occurred for a certain period of time. The receiving device interprets that indication and inserts zeros for that period. Sometimes VADs makes mistakes. The system can be modified to account for VAD-specific errors. One way to account for VAD-specific errors is to score low energy sounds (such as f, s, th) as more likely than high energy voiced sounds (such as ah, aa, aw) rather than making all acoustic scores the same. This and techniques can apply if the system knows that the zeros (or other pattern) are the result of a VAD error or peculiarity, and not missing packets. However, the system should be careful to confuse quiet sections with missing segments. For example, a quiet section can be simply a low-energy sound such as a soft fricative. Another application involving speech with missing segments is speech recognition of deteriorated media, such as phonograph cylinders, records, and audio cassettes.

The system generates a plurality of hypotheses for the missing segment (204). The system can generate a hypothesis for each possible or plausible missing segment. For example, the system receives the word "roof" with the vowels missing, "r??f", the system generates a hypothesis for each possible option (raff, ref, riff, rough, ruff, roof, reef, Rudolph, and so forth). In one aspect, the system further identifies a duration for the missing segment and generates the plurality of hypotheses of the identified duration for the missing segment. In this aspect, the system narrows down the above list of hypotheses to those having the same duration as the missing segment (raff, riff, ruff, roof, reef). In one aspect, the system assigns each of the plurality of hypotheses an identical acoustic score or weight, meaning that each is equally likely, at least initially. The identical acoustic score or weight can reflect a certainty of the hypotheses.

The system identifies a best hypothesis for the missing segment (206). The system can base this step on speech context, a pronouncing lexicon, and/or a language model. For a more detailed discussion of how this step applies to an example missing segment, see FIG. 4.

The system recognizes the received speech by inserting the identified best hypothesis for the missing segment (208). In another aspect, the system synthesizes the received speech by inserting the identified best hypothesis for the missing segment. The same principles described for speech recognition on speech with missing segments can be applied to speech synthesis on a cellular phone, personal computer, or other device with speech with missing segments. The system can use a duration model in addition to the pronunciation, language and other models. A duration model can be based on mean and variance of duration for individual context-dependent phoneme acoustic models.

FIG. 3 illustrates received speech with a missing segment. The speech 300 is transferred over a packet-switched network, and is divided into six packets in this case. The first two packets 302, 304 are each 300 milliseconds long and are present. The second two packets 306, 308 are missing and are of an undetermined length. The third two packets 310, 312 are each 300 milliseconds long and are both present. The system can extrapolate or estimate their lengths based on surrounding packet information. In this case, the surrounding packets are all 300 milliseconds long, so the system can safely determine that the missing packets are also 300 milliseconds long for a total gap of 600 milliseconds. Packets of variable lengths are possible. In some cases, the missing packets are not missing, but are simply delayed. Delayed packets which arrive far too late are effectively missing, especially in time-sensitive applications such as speech recognition or synthesis. Rather than wasting valuable milliseconds or seconds waiting for the missing packets, the system can use the principles described herein to insert a best hypothesis in the missing segments to make the best immediate use of the non-missing packets.

FIG. 4 illustrates an example of identifying a best hypothesis for a missing segment. The question mark in the received sentence "We saw a ?ebra at the zoo." 402 indicates the missing segment. The system identifies the word "?ebra" as missing a segment and generates a list of hypotheses for the missing segment 404. Many hypotheses are possible of varying lengths. For instance, in this example the system could easily identify the word "Cerebra" as a possible hypothesis. However, the system can restrict the list to those hypotheses that fit within the duration of the missing segment. The system can also remove entries from the list of hypotheses which do not create actual words according to a language model and/or pronouncing lexicon. After removing hypotheses which do not create words and which are too long, the system is left with two hypotheses for the word with the missing segment, "Libra" and "Zebra" 406. The system then selects the hypothesis "Zebra" based on the speech context regarding a zoo 408. In this sentence's context, "Libra" could refer to seeing a person at the zoo who was born under the Zodiac sign Libra. However "Zebra" makes more sense in this context. The system uses conventional speech recognition algorithms modified to use the identical pre-determined likelihood score for all parts of the acoustic models for the missing segments of speech, allowing the pronouncing dictionary and the language model, including the available speech, to dominate the selection of the best recognition path.

Figure 5:
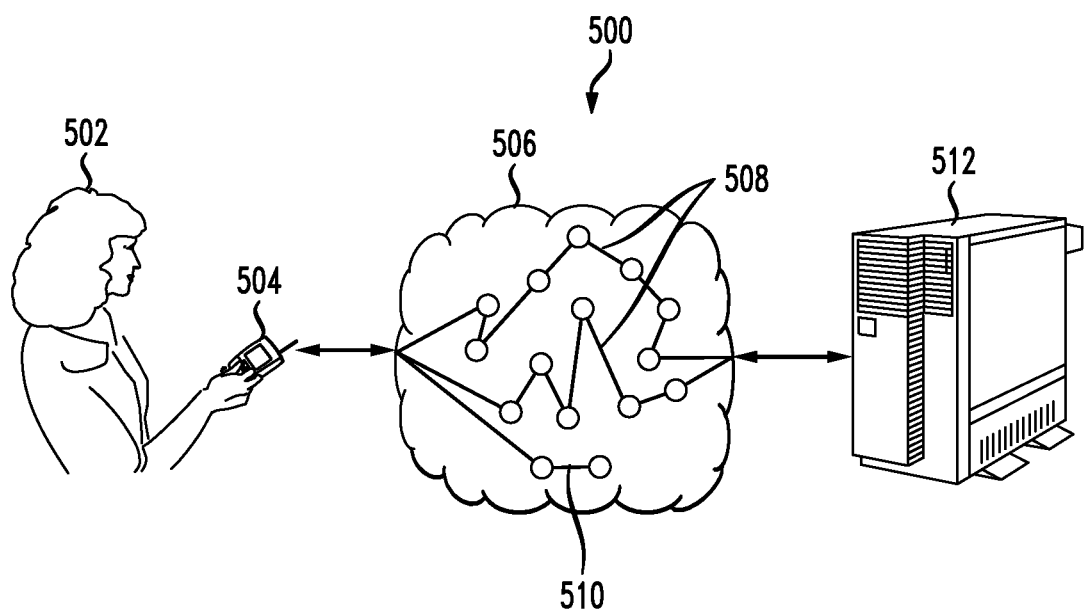
FIG. 5 illustrates an exemplary network-connected system for recognizing and synthesizing speech.

FIG. 5 illustrates an exemplary network-connected system for recognizing and synthesizing speech. The system 500 interacts with a user 502 through a communications device 504 such as a cellular phone, VoIP phone, computer, or other voice medium. The system can recognize user speech from a recording such as voicemail. The communications device 504 transmits user speech over a network 506 to a server 512. Often, the system splits user speech into packets and routes those packets through different paths 508, 510 in the network 506. Some paths are different lengths than other paths. Some paths are dead ends because a router drops a packet. Other paths are much slower, meaning that packets are effectively missing because they arrive too late to be of any use. The server performs the steps as outlined in FIG. 2 to recognize speech with missing segments.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to both speech recognition and synthesis with missing segments, such as those due to dropped packets. Those skilled in the art will readily recognize various modifications and changes that may be made to the present invention without following the example embodiments and applications illustrated and described herein, and without departing from the true spirit and scope of the present invention.

We claim:

1. A method comprising:
   receiving, at a computing device, speech represented by speech packets transmitted over a packet network;
   generating, via a processor of the computing device, a plurality of hypotheses for a missing segment of the speech, the plurality of hypotheses based on an acoustic feature of the speech, wherein the missing segment is missing due to lost packets of the speech as the speech packets are transmitted over the packet network;
   assigning a same acoustic score to each hypothesis in the plurality of hypotheses;
   evaluating the plurality of hypotheses using the acoustic score to identify a possible hypothesis that represents the missing segment of the speech; and
   outputting a modified version of the speech, wherein the modified version of the speech is constructed by inserting the possible hypothesis into the missing segment of the speech.

2. The method of claim 1, wherein the evaluating of the plurality of hypotheses is further based on a context of the speech.

3. The method of claim 2, wherein generating of the plurality of hypotheses further comprises:
   identifying a duration for the missing segment; and
   generating the plurality of hypotheses having a length equal to the duration.

4. The method of claim 1, wherein evaluating of the plurality of hypotheses is based on a pronouncing lexicon.

5. The method of claim 1, wherein evaluating of the plurality of hypotheses is based on a language model.

6. The method of claim 1, wherein the same acoustic score represents a certainty of the plurality of hypotheses.

7. The method of claim 1, wherein evaluating of the plurality of hypotheses is based on a duration model.

8. The method of claim 7, wherein the duration model is based on a mean and a variance of duration for individual context-dependent phoneme acoustic models associated with the plurality of hypotheses.

9. A system comprising:
   a processor; and
   a computer-readable storage medium having instructions stored which, when executed by the processor, cause the processor to perform operations comprising:
   receiving speech represented by speech packets transmitted over a packet network;
   generating a plurality of hypotheses for a missing segment of the speech, the plurality of hypotheses based on an acoustic feature of the speech, wherein the missing segment is missing due to lost packets of the speech as the speech packets are transmitted over the packet network;
   assigning a same acoustic score to each hypothesis in the plurality of hypotheses;
   evaluating the plurality of hypotheses using the acoustic score to identify a possible hypothesis that represents the missing segment of the speech; and
   outputting a modified version of the speech, wherein the modified version of the speech is constructed by inserting the possible hypothesis into the missing segment of the speech.

10. The system of claim 9, wherein the evaluating of the plurality of hypotheses is further based on a context of the speech.

11. The system of claim 10, wherein generating of the plurality of hypotheses further comprises:
    identifying a duration for the missing segment; and
    generating the plurality of hypotheses having a length equal to the duration.

12. The system of claim 9, wherein evaluating of the plurality of hypotheses is based on a pronouncing lexicon.

13. The system of claim 9, wherein evaluating of the plurality of hypotheses is based on a language model.

14. The system of claim 9, wherein the same acoustic score represents a certainty of the plurality of hypotheses.

15. The system of claim 9, wherein evaluating of the plurality of hypotheses is based on a duration model.

16. The system of claim 15, wherein the duration model is based on a mean and a variance of duration for individual context-dependent phoneme acoustic models associated with the plurality of hypotheses.

17. A computer-readable storage device having instructions stored which, when executed by a computing device, cause the computing device to perform operations comprising:
    receiving, at the computing device, speech represented by speech packets transmitted over a packet network;
    generating, via a processor of the computing device, a plurality of hypotheses for a missing segment of the speech, the plurality of hypotheses based on an acoustic feature of the speech, wherein the missing segment is missing due to lost packets of the speech as the speech packets are transmitted over the packet network;
    assigning a same acoustic score to each hypothesis in the plurality of hypotheses;
    evaluating the plurality of hypotheses using the acoustic score to identify a possible hypothesis that represents the missing segment of the speech; and
    outputting a modified version of the speech, wherein the modified version of the speech is constructed by inserting the possible hypothesis into the missing segment of the speech.

18. The computer-readable storage device of claim 17, wherein the evaluating of the plurality of hypotheses is further based on a context of the speech.

19. The computer-readable storage device of claim 18, wherein generating of the plurality of hypotheses further comprises:
    identifying a duration for the missing segment; and
    generating the plurality of hypotheses having a length equal to the duration.

20. The computer-readable storage device of claim 19, wherein evaluating of the plurality of hypotheses is based on a pronouncing lexicon.

* * * * *